(12) United States Patent
Lessmann et al.

(10) Patent No.: US 9,242,809 B2
(45) Date of Patent: Jan. 26, 2016

(54) METHOD FOR TRANSFERRING AIR CARGO LOADING UNITS, AND TRANSFER AND SCREENING SYSTEM FOR CARRYING OUT SAID METHOD

(75) Inventors: Bernhard Lessmann, Neu-Isenburg (DE); Benjamin Bierwirth, Frankfurt am Main (DE); Heinrich Frye, Frankfurt am Main (DE)

(73) Assignee: FRAPORT AG, FRANKFURT AIRPORT SERVICES WORLDWIDE (DE)

( * ) Notice: Subject to any disclaimer, the term of this patent is extended or adjusted under 35 U.S.C. 154(b) by 1263 days.

(21) Appl. No.: 12/445,068

(22) PCT Filed: Oct. 11, 2007

(86) PCT No.: PCT/EP2007/008843
§ 371 (c)(1),
(2), (4) Date: Jun. 23, 2009

(87) PCT Pub. No.: WO2008/043556
PCT Pub. Date: Apr. 17, 2008

(65) Prior Publication Data
US 2010/0040440 A1   Feb. 18, 2010

(30) Foreign Application Priority Data
Oct. 11, 2006   (DE) .......................... 20 2006 015 603

(51) Int. Cl.
*B65G 1/00*    (2006.01)
*B65G 63/00*   (2006.01)
(Continued)

(52) U.S. Cl.
CPC .............. *B65G 63/002* (2013.01); *B64F 1/368* (2013.01); *B65G 69/2876* (2013.01)

(58) Field of Classification Search
None
See application file for complete search history.

(56) References Cited

U.S. PATENT DOCUMENTS

| 4,199,290 A * | 4/1980 | Jacoby ........................ 414/354 |
| 4,251,726 A   | 2/1981 | Alvarez ....................... 250/302 |

(Continued)

OTHER PUBLICATIONS

EPO Search Report, dated Apr. 4, 2008, (4 pgs).
(Continued)

*Primary Examiner* — Saul Rodriguez
*Assistant Examiner* — Willie Berry, Jr.
(74) *Attorney, Agent, or Firm* — Hayes Soloway P.C.

(57) ABSTRACT

A method of transferring air cargo loading units (12) between a publicly accessible operational zone (A) and a security-sensitive apron zone (B), including a stationary transfer and security checking system (10) which comprises a first transfer device (22), a second transfer device (24), and a cargo lock (14) in between, the cargo lock (14) including a lock chamber (16) which is connected to the first transfer device (22) via a cargo entrance gate (18) and to the second transfer device (24) via a cargo exit gate (20), includes the following method steps:
  a) the air cargo loading units (12) are delivered by a road or rail transport means (28) via the publicly accessible operational zone (A);
  b) the cargo entrance gate (18) is opened with the cargo exit gate (20) in the closed condition;
  c) the air cargo loading units (12) are transported into the lock chamber (16) by means of the first transfer device (22);
  d) the lock chamber (16) is separated from the publicly accessible operational zone (A) by closing the cargo entrance gate (18);
  e) a security check of the air cargo loading units (12) is performed in the closed lock chamber (16);
  f) the lock chamber (16) is connected to the security-sensitive apron zone (B) by opening the cargo exit gate (20);
  g) the air cargo loading units (12) are loaded onto air cargo apron transport units (34) by means of the second transfer device (24).

The present invention further relates to a transfer and security checking system (10) for carrying out this method.

11 Claims, 2 Drawing Sheets

(51) Int. Cl.
    *B64F 1/36*        (2006.01)
    *B65G 69/28*       (2006.01)

(56) References Cited

U.S. PATENT DOCUMENTS

| | | | | |
|---|---|---|---|---|
| 4,741,275 | A * | 5/1988 | Lewiner et al. | 109/7 |
| 4,991,912 | A * | 2/1991 | Fox | 312/236 |
| 5,668,342 | A | 9/1997 | Discher | 86/50 |
| 6,474,599 | B1 * | 11/2002 | Stomski | 244/118.5 |
| 6,484,650 | B1 * | 11/2002 | Stomski | 109/6 |
| 7,358,733 | B2 * | 4/2008 | Clark et al. | 324/318 |
| 7,373,867 | B2 * | 5/2008 | Ryan | 86/50 |
| 7,397,892 | B2 * | 7/2008 | Linev | 378/57 |
| 7,784,389 | B2 * | 8/2010 | Mardirossian | 89/1.11 |
| 2002/0154012 | A1 * | 10/2002 | Risi | 340/541 |
| 2005/0258231 | A1 * | 11/2005 | Wiater | 235/375 |

OTHER PUBLICATIONS

PCT International Preliminary Report on Patentability, dated Oct. 11, 2007, PCT/EP2007/008843, (6 pgs).

* cited by examiner

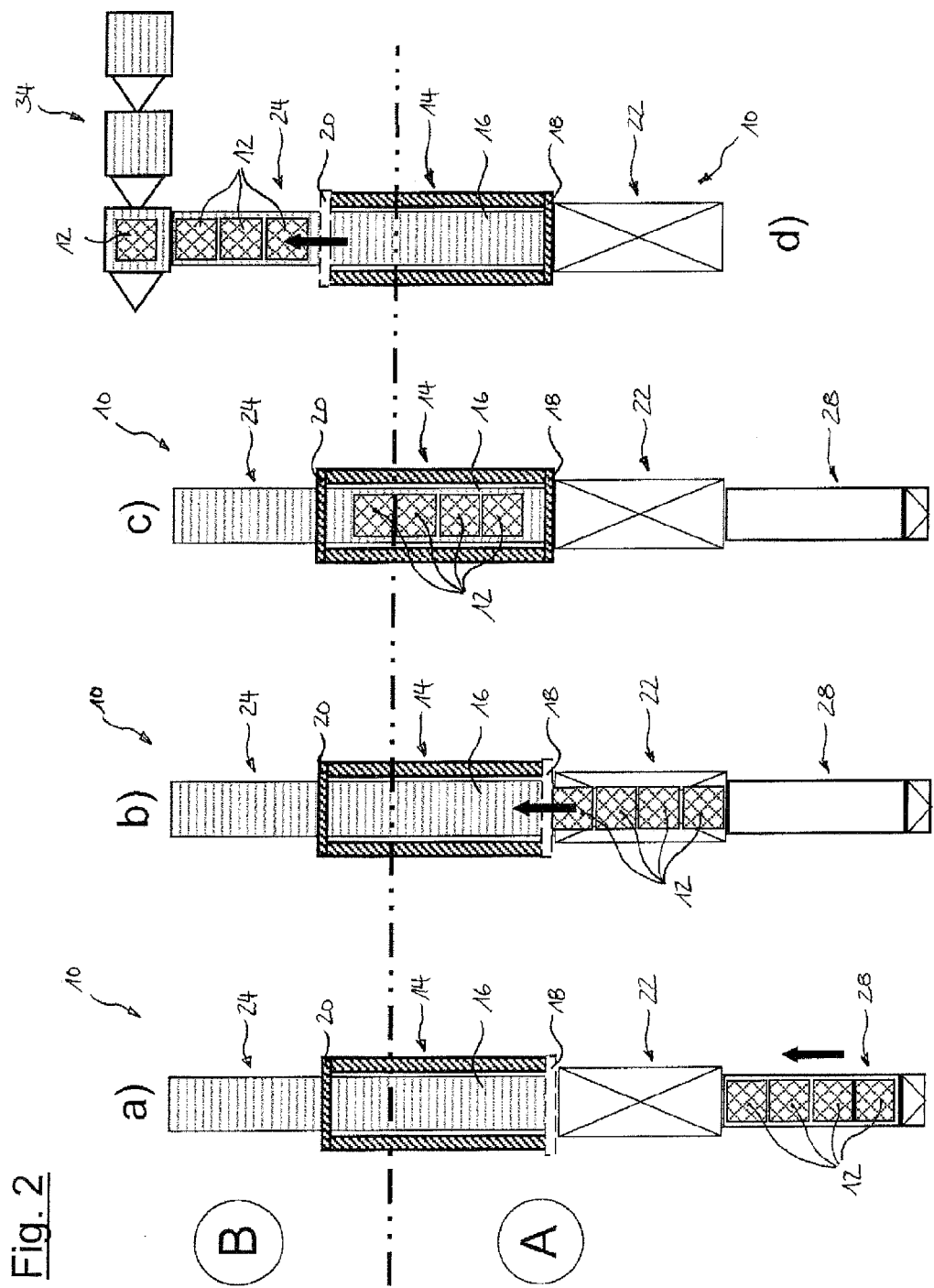

METHOD FOR TRANSFERRING AIR CARGO LOADING UNITS, AND TRANSFER AND SCREENING SYSTEM FOR CARRYING OUT SAID METHOD

FIELD OF THE INVENTION

The present invention relates to a method of transferring air cargo loading units between a publicly accessible operational zone and a security-sensitive apron zone, and to a transfer and security checking system for carrying out this method.

BACKGROUND

Transfer of air cargo loading units at an airport from a road or rail transport means to an air cargo apron transport means always involves a transfer of the cargo from a publicly accessible operational zone to a secured and security-sensitive apron zone. Up to now, the air cargo loading units were first transferred in the publicly accessible operational zone from the road or rail transport means to the air cargo apron transport means, e.g. with the aid of fork lift trucks. Thereafter, when the loaded air cargo apron transport means was transferred from the publicly accessible operational zone to the security-sensitive apron zone, an extensive security check was performed which, in addition to checking the air cargo loading units, also included a respective security check of the apron transport means along with its driver.

The expenses for carrying out the goods transfer and the attendant security checks constantly increase here against the background of tightened security regulations.

SUMMARY

The present invention now provides a method of transferring air cargo loading units between a publicly accessible operational zone and a security-sensitive apron zone, including a stationary transfer and security checking system which comprises a first transfer device, a second transfer device, and a cargo lock in between, the cargo lock including a lock chamber which is connected to the first transfer device via a cargo entrance gate and to the second transfer device via a cargo exit gate, and the method including the following steps:

a) the air cargo loading units are delivered by a road or rail transport means via the publicly accessible operational zone;

b) the cargo entrance gate is opened with the cargo exit gate in the closed condition;

c) the air cargo loading units are transported into the lock chamber by means of the first transfer device;

d) the lock chamber is separated from the publicly accessible operational zone by closing the cargo entrance gate;

e) a security check of the air cargo loading units is performed in the closed lock chamber;

f) the lock chamber is connected to the security-sensitive apron zone by opening the cargo exit gate;

g) the air cargo loading units are loaded onto air cargo apron transport units by means of the second transfer device.

In this method, the security check is advantageously integrated in the transfer process, with the transport distance used for the transfer being utilized for the security checking process. With a view to the sequence in time, the security check is, however, decoupled within the transfer method since the transfer method can be subdivided into several separate method sections which can be carried out immediately one after the other or with a time delay. As a result, the staff in charge of delivery and/or unloading, the security staff, and the apron staff are able to work essentially independently of each other, so that the method may be carried out particularly efficiently in terms of staff.

Preferably, the air cargo apron transport units move exclusively inside the security-sensitive apron zone. The recurring, time-consuming security checks of the apron transport means and its driver during the transfer from the public operational zone to the security-sensitive apron zone are thereby omitted.

The road or rail transport means, on the other hand, preferably move exclusively inside the publicly accessible operational zone. This means that the security checks for the road or rail transport means and their drivers are also dispensed with. Accordingly, the security check remains limited to the relevant air cargo loading units, as a result of which the expense of time and staff is reduced for all parties involved.

Following method step d) and/or e), the lock chamber may be used for an intermediate storage. Since, following these method steps, the air cargo loading units are situated in the closed lock chamber, an interruption of the method is possible without difficulty. The groups of staff involved in the transfer and checking process may thus be employed very flexibly and largely independently of one another, which has a positive effect on staff efficiency.

In one variant of the method, the security check in step e) comprises a visual check carried out by security staff.

Further, the security check in step e) is particularly preferably carried out by means of a detection and/or checking device which comprises at least one of the following apparatus or a combination thereof: [0018] scales, camera for contour measurement, thermal imaging camera, X-ray apparatus, bar code scanner, interrogation transceiver for RFID detection, device for detecting chemical emissions, explosives detector, and radioactivity detector. These apparatus of the detection and/or checking device, some of which are very expensive and complex, may be employed particularly efficiently in a stationary system in which the lock chamber is specially designed for the requirements of the security check.

The present invention therefore also comprises a transfer and security checking system for carrying out the method described above, comprising a cargo lock including a lock chamber, a cargo entrance gate and a cargo exit gate, the lock chamber being connected to a first transfer device via the cargo entrance gate and to a second transfer device via the cargo exit gate, a control device being provided which makes sure that the cargo exit gate is closed while the cargo entrance gate is opening or open, and vice versa, and the lock chamber including a detection and/or checking device for the air cargo loading units. As already mentioned above, this system is suitable for particularly efficiently carrying out the above-described method of transferring air cargo loading units between a publicly accessible operational zone and a security-sensitive apron zone. It is, in fact, possible to considerably reduce the expenditure of time and staff while complying with the respectively applicable security regulations since a detection and/or security check of the air cargo loading units is performed by means of the detection and/or checking device in the lock chamber between the goods entrance through the cargo entrance gate and the goods exit through the cargo exit gate. Any shuttle traffic of staff and air cargo apron transport units between the publicly accessible operational zone and the security-sensitive apron zone is no longer necessary so that the recurring security checks of the staff and of the apron transport means may be dispensed with. A further advantage is that the transfer process and the security check of the air cargo loading units can be effected staggered in time, without staff or transport capacities being tied down. To this end, the air cargo loading units are simply "intermediately stored" in the lock chamber, with the cargo entrance and exit gates closed.

In one embodiment, the cargo entrance gate and the cargo exit gate are arranged at opposite ends of the lock chamber. In this way, the air cargo loading units may be moved through the cargo lock in a very simple manner, e.g. on roller conveyors, preferably powered roller conveyors, without a change of direction being required.

The detection and/or checking device particularly preferably comprises at least one of the following apparatus: [0022] scales, camera, thermal imaging camera, radioactivity detector, explosives detector, X-ray apparatus, device for detecting chemical emissions, bar code scanner, interrogation transceiver for RFID detection. The lock chamber may be thereby adjusted to the respective current security provisions without difficulty, by exchanging or retrofitting individual apparatus.

BRIEF DESCRIPTION OF THE DRAWINGS

The invention will be described below on the basis of a preferred embodiment which is illustrated in the accompanying drawings, in which:

FIGS. 2a to 2d schematically show the sequence of the transfer method according to the invention.

DETAILED DESCRIPTION

Figure 1:
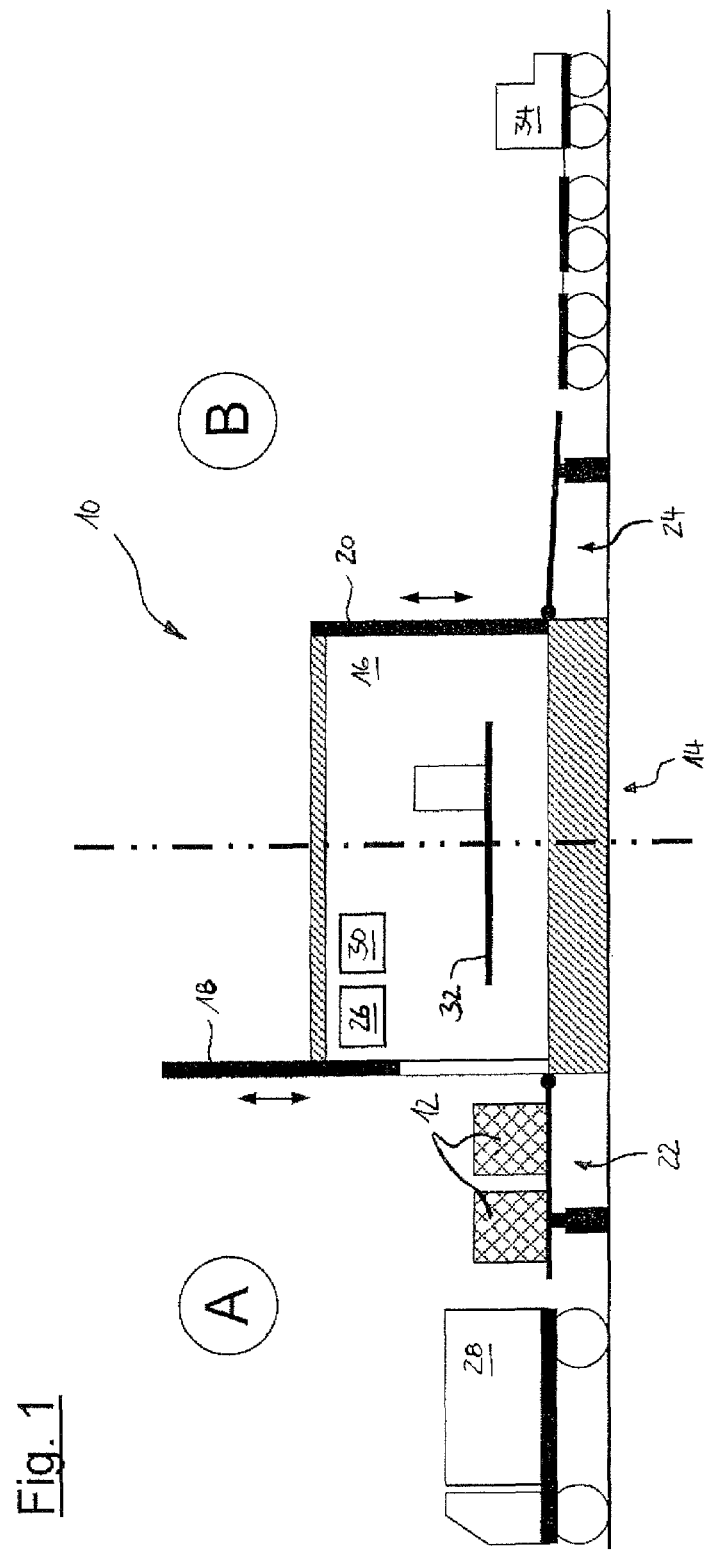
FIG. 1 shows a schematic sectional view of the transfer and security checking system according to the invention.

FIG. 1 shows a transfer and security checking system 10 for air cargo loading units 12, comprising a cargo lock 14 including a lock chamber 16, a cargo entrance gate 18 and a cargo exit gate 20. The lock chamber 16 is connected to a first transfer device 22 via the cargo entrance gate 18 and to a second transfer device 24 via the cargo exit gate 20. The cargo lock 14 further includes a control device 26 which makes sure that the cargo exit gate 20 is closed while the cargo entrance gate 18 is opening or open. Likewise, the control device 26 makes sure that the cargo entrance gate 18 is closed while the cargo exit gate 20 is opening or open. The cargo lock 14 thereby is an interface between a publicly accessible operational zone A and a security-sensitive apron zone B, with the control device 26 making provision that there never exists a direct, i.e. freely passable, connection between the first transfer device 22 in the zone A and the second transfer device 24 in the zone B.

The cargo entrance gate 18 and the cargo exit gate 20 are schematically illustrated as lifting gates in FIG. 1. Alternatively, in other embodiments the gates 18, 20 are embodied as rolling gates, wing gates, etc.

With reference to FIGS. 2a to 2d, the sequence of the method of transferring air cargo loading units 12 including the respective security check is discussed below:

In a first method step (FIG. 2a) the air cargo loading units 12 are delivered by a road or rail transport means 28, for example a truck, and transported into the lock chamber 16 via the first transfer device 22 (cf. FIG. 2b). In FIG. 1, the first transfer device 22 is illustrated in the form of a swiveling ramp. Alternatively, however, a lifting table, a mobile transfer apparatus (such as a fork lift truck) or the like may also be provided to serve as the first transfer device 22. To ensure a smooth transport of the air cargo loading units 12 from the transport means 28 to the lock chamber 16, the first transfer device 22 is preferably configured such that it can be adjusted to the particular transport means 28 in terms of its height and/or inclination. In some variants, the first transfer device 22 additionally includes a roller conveyor, preferably a powered roller conveyor, in order to further simplify the transport of the air cargo loading units 12 and to expedite the entire process of goods transfer and security check.

In these method steps according to FIGS. 2a and 2b, it is ensured by the control device 26 (cf. FIG. 1) that the cargo entrance gate 18 is open and the cargo exit gate 20 is closed. At this stage of the goods transfer, the lock chamber 16 is thus part of the publicly accessible operational zone A and is separated from the security-sensitive apron zone B by the cargo exit gate 20. Unloading of the transport means 28 and transporting the air cargo loading units 12 into the lock chamber 16 is effected in the presence of security staff, who check the air cargo loading units 12 delivered for completeness and intactness.

After the process of unloading the road or rail transport means 28, in a further step the cargo entrance gate 18 is closed and a security check of the air cargo loading units 12 is performed in the lock chamber 16 (FIG. 2c). Depending on the respective security provisions, a detection and/or checking device 30 is provided in the lock chamber 16. This detection and/or checking device 30 may comprise, for example, apparatus such as a pair of scales, a camera (for contour measurement in particular), a thermal imaging camera, a radioactivity detector, an explosives detector, an X-ray apparatus, a device for detecting chemical emissions, a bar code scanner or an interrogation transceiver for an RFID detection. In addition, a (raised) catwalk 32 may be provided in the cargo lock 14 for security staff to carry out a visual check.

After the security check has been effected, in a further method step according to FIG. 2d, the cargo exit gate 20 is opened while the cargo entrance gate 18 is in the closed condition, with the lock chamber 16 now being part of the security-sensitive apron zone B and separated from the publicly accessible operational zone A by the closed cargo entrance gate 18. The air cargo loading units 12 may be loaded onto air cargo apron transport units 34, e.g. so-called dollies, by means of a second transfer device 24 and transported to an aircraft.

In principle, the second transfer device 24 may be configured analogously to the first transfer device 22 described above. But since the air cargo apron transport units 34 are, as a rule, at least approximately of identical construction, a simple, rigid ramp may possibly also be sufficient to serve as second transfer device 24. Especially advantageously, however, the second transfer device 24 is also provided with a roller conveyor, preferably a powered roller conveyor, to facilitate transport of the air cargo loading units 12 from the lock chamber 16 onto the air cargo apron transport units 34. Once all of the air cargo loading units 12 from the lock chamber 16 have been loaded onto the apron transport units 34, the cargo exit gate 20 is closed and subsequently the cargo entrance gate 18 is opened. The cargo lock 14 of the transfer and security checking system 10 may now be charged with air cargo loading units 12 again.

Owing to the method according to the invention of transferring air cargo loading units between a publicly accessible operational zone and a security-sensitive apron zone, and the corresponding transfer and security checking system 10 according to the invention, neither the staff nor the apron transport units 34 need to cross the "border" between the publicly accessible operational zone A and the security-sensitive apron zone B. Accordingly, the constantly recurring checks of the staff and the air cargo apron transport means 34 upon entry to the security-sensitive apron zone B are dispensed with. As a result, the security check remains limited to the relevant air cargo loading units 12. This allows the transfer process and the security check to be carried out quickly and effectively.

The invention claimed is:

1. A method of transferring air cargo loading units between a publicly accessible operational zone (A) and a security-sensitive apron zone (B), comprising
a stationary transfer and security checking system which comprises a first transfer device, a second transfer device configured similar to the first transfer device, and a cargo lock in between,
the cargo lock including a lock chamber which is connected to the first transfer device via a cargo entrance gate and to the second transfer device via a cargo exit gate, and
the method including the following steps:
   a) the air cargo loading units are delivered by a road or rail transport system via the publicly accessible operational zone (A);
   b) the cargo entrance gate is opened with the cargo exit gate in the closed condition;
   c) the air cargo loading units are transported into the lock chamber using the first transfer device;
   d) the lock chamber is separated from the publicly accessible operational zone (A) by closing the cargo entrance gate;
   e) a security check of the air cargo loading units is performed in the closed lock chamber;
   f) the lock chamber is connected to the security-sensitive apron zone (B) by opening the cargo exit gate; and
   g) the air cargo loading units are loaded onto air cargo apron transport units using the second transfer device,
wherein the air cargo apron transport units move exclusively inside the security-sensitive apron zone (B), and the road or rail transport system move exclusively inside the publicly accessible operational zone (A).

2. The method according to claim 1, wherein following step d) and/or e), the lock chamber is used for intermediate storage.

3. The method according to claim 1, wherein the security check in step e) comprises a visual check carried out by security staff.

4. The method according to claim 1, wherein the security check in step e) is carried out using a detection and/or checking device which comprises at least one of the following apparatus or a combination thereof selected from the group consisting of:
a scale, a camera for contour measurement, a thermal imaging camera, an X-ray apparatus, a bar code scanner, an interrogation transceiver for RFID detection, a device for detecting chemical emissions, an explosives detector, and a radioactivity detector.

5. A transfer and security checking system for carrying out the method according to claim 1, comprising
a cargo lock including a lock chamber, a cargo entrance gate and a cargo exit gate,
the lock chamber being connected to a first transfer device via the cargo entrance gate and to a second transfer device configured similar to the first transfer device via the cargo exit gate,
a control device being provided which makes sure that the cargo exit gate is closed while the cargo entrance gate is opening or open, and vice versa, and
the lock chamber including a detection and/or checking device for the air cargo loading units.

6. The system according to claim 5, wherein the cargo entrance gate and the cargo exit gate are arranged at opposite ends of the lock chamber.

7. The system according to claim 5, wherein the detection and/or checking device comprises at least one of the following apparatus selected from the group consisting of a scale, a camera, a thermal imaging camera, a radioactivity detector, an explosives detector, an X-ray apparatus, a device for detecting chemical emissions, a bar code scanner, and an interrogation transceiver for RFID detection.

8. The system according to claim 5, wherein the first transfer device and the second transfer device are swiveling ramps.

9. The system according to claim 8, wherein the second transfer device is provided with a roller conveyor.

10. The method according to claim 1, wherein the first transfer device and the second transfer device are swiveling ramps.

11. The method according to claim 10, wherein the second transfer device is provided with a roller conveyor.

* * * * *